United States Patent Office 2,952,631
Patented Sept. 13, 1960

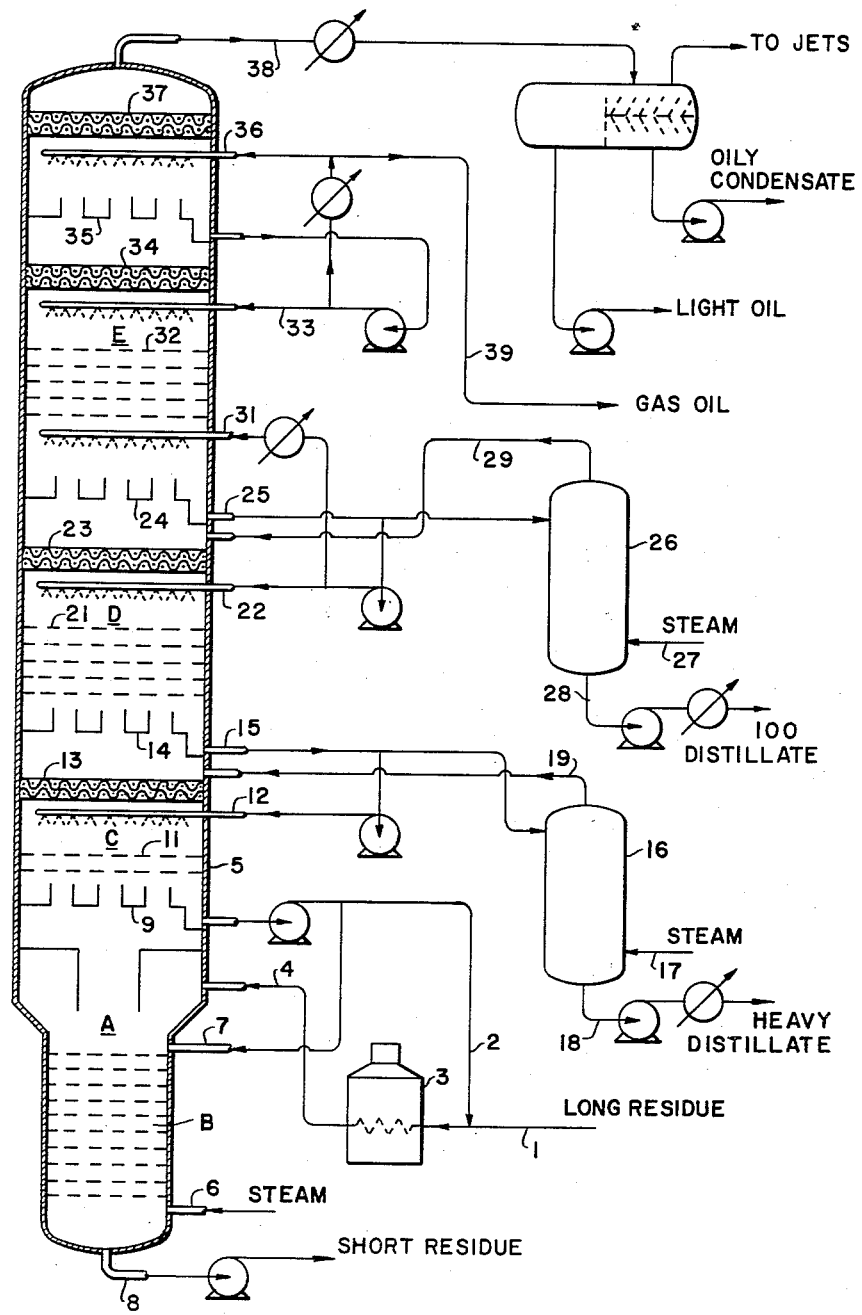

2,952,631

DISTILLATION OF LUBRICATING OIL

Douglas C. Hausch, Scarsdale, N.Y., assignor to Shell Oil Company, a corporation of Delaware Filed Nov. 26, 1957, Ser. No. 698,950

1 Claim. (Cl. 208—355)

This invention relates to the fractional distillation of heavy hydrocarbon oil containing lubricating oil and lighter and heavier material to separate a lubricating oil distillate.

Lubricating oils, as is well known, are separated from certain heavy oils, hereinafter called lube stock, by fractionation under high vacuum. In general two or more lube distillates having different viscosities are separated from the lube stock. A very high degree of fractionation is not normally possible. When the lube distillate is separated by a tray to tray separation in a fractionation column the distillate has a long tail (in A.S.T.M. distillation). It has been found that if this tail is reduced the filtration rates in the dewaxing process may be markedly improved.

An object of my invention is to provide an improved method for separating lube oils from the mentioned lube oil stocks by fractional distillation. A further object is to provide an improved method whereby less overlap between neighboring fractions may be obtained by effectively preventing higher boiling portions of said stock from passing upward into the rectification section of the next lower boiling product and allowing less lower boiling portions of said stock from passing downward with the reflux into the next higher boiling distillation product or bottoms fraction. These objects are accomplished by effectively dividing the distillation zone into flashing, stripping and rectification zones which are more (nearly) isolated from one another and controlling the rectification in the rectification section by reflux sprays at the point of withdrawal of distillate products as will be more clear from the following description of the process. In this description reference will be made to the accompanying drawing which shows semi-diagrammatically one suitable apparatus for the separation of a lube stock into a bottom fraction, two lube distillate fractions, and tops.

Referring to the drawing, the lube stock entering by line 1 is mixed with heavy condensate from line 2 and preheated in heater 3 to a temperature slightly in excess of that required to flash all of the desired product material under the prevailing flash pressure but insufficient to cause any appreciable amount of cracking. The preheated mixture is then passed by line 4 into the flashing zone A of the distillation column 5. The flashing zone A is maintained under vacuum, e.g., a pressure of 10–100 mm. Hg. The flashed vapors pass upward and the liquid residue passes downward through the stripping zone B wherein it is stripped by steam introduced by line 6. As will be further explained later a portion of heavy condensate is likewise introduced near the top of the stripping zone by line 7. The bottoms fraction is removed from the bottom of the stripping zone by line 8.

The flashed vapors are passed upward through the chimney-collecting pan 9 into zone C containing grid trays 11, and then upward countercurrently to a spray of condensate introduced by line 12 immediately below a foraminous mist coalescer 13. The vapors then are passed through the mist coalescer and through a second chimney-collecting tray 14 into the rectification section D. The intermediate condensate collected on tray 14 is withdrawn by line 15 and passed in part by line 12 to serve as the reflux condensate sprayed into the zone C. The remaining part is passed to a side stripper 16 wherein it is stripped with steam introduced by line 17. The lube oil distillate is withdrawn from the bottom of stripper 16 by line 18. The vaporous stripped product from stripper 16 is passed by line 19 and introduced into column 5 at a point below the tray 14 but above the mist coalescer 13.

The vapors passing up through the rectification zone D are caused to flow through the grid trays and then upward through a spray of light reflux condensate introduced by line 22 at a point above the tray 21 but below the mist coalescer 23 and then up through the mist coalescer 23 and the chimney-collection tray 24. Light reflux condensate collected on tray 24 is withdrawn by line 25. Part of this material is recycled to a point in the next lower section below the mist coalescer 23 and the remainder is passed to a side stripper 26 wherein it is stripped with steam introduced by line 27. Light lube distillate is withdrawn from the bottom of stripper 26 by line 28. The vaporous stripped products from stripper 26 are passed by line 29 and introduced into the column 5 at a point below the chimney-collection tray 24 and above the mist coalescer 23.

The vapors passing up through the chimney tray 24 are cooled by countercurrent contact with reflux spray introduced by line 31 and are then rectified in passing up through the grid trays 32. These vapors are then further contacted with reflux spray introduced by line 33, passed through the mist coalescer mat 34, passed through chimney tray 35 and are then further cooled by a spray of cooled reflux introduced by line 36. After passing through the final mist coalescer mat 37 the vapors are passed by line 38 to the condensing and collecting system.

Liquid collected on the top chimney tray 35 is partly cooled and recycled to the spray by line 36, part is introduced without cooling as a spray above the trays in the rectification zone E and the remainder is withdrawn as gas oil by line 39.

The liquid collected on chimney tray 24 is split three ways in a similar fashion which differs from the handling of the liquid collected on the lower chimney trays.

It may be noted that the described operation combines the spray contacting with grid tray rectification. Liquid collected on the chimney trays is pumped through spray nozzles to provide finely divided liquid droplets which afford intimate contact with the rising vapors. The spray zones are located at the product withdrawal points and this reduces the long "tail" normally obtained with a tray-to-tray separation. The mist coalescing mats directly above the sprays serve to prevent liquid droplets from being carried up the column in the vapor stream. Preferred foraminous mist coalescers take the form of a mat of tangled wire several inches thick, such for example as the so-called York mat manufactured by Otto H. York Inc., West Orange, New Jersey or the so-called Metex Mat manufactured by the Metal Textile Corporation, Roselle, New Jersey. These mats have an open volume upward of 85% and a density between about 3 and 15 pounds per cubic foot depending upon how much they are compressed. Such mats offer a very small pressure drop.

A further advantage of my process for distilling lubricating oils is that the energy for mixing is supplied by the pumps which supply the sprays and hence the pressure drop through the apparatus is reduced. Also the effectiveness of the grid trays is improved through better distribution of liquid supplied by the sprays.

In the top section of the column where heat is removed two sprays are used and cooled liquid is pumped through the upper of the two sprays. In the bottom section a portion of the hydrocarbon flashed from the feed is recycled back through the furnace heater to supply additional heat and promote flashing. This results in some overflashing. Then sufficient flashed material is passed to the stripping section to provide the proper cut point. This is more desirable than controlling the cut point through control of the flash temperature since variation in the latter affects the operation of the column and the quality of the products.

*Example*

In a typical case a 28° API gravity East Texas lubricating oil stock is fractionated in an apparatus similar to that illustrated except that one additional stage (similar to that shown for the recovery of heavy distillate lube oil) is included so as to produce besides the heavy distillate and 100 distillate also a 250 distillate lubricating oil. This feed stock is supplied at a rate of 13,000 barrels per day which with 1,300 b./d. distillate recycled through the heater gives a combined feed of 14,300 b./d. This feed stock after being preheated to a temperature of about 750° F. is charged to the column at a pressure of about 45–50 mm. Hg. Short residue withdrawn from the stripping section is 3,300 b./d. and 17.5° API. Flashed material withdrawn from pan 9 is 1690 b./d. of which 390 b./d. are cycled to the stripping zone by line 7 and 1300 b./d. are cycled to the heater.

The flows in barrels per day of liquids from the chimney trays are approximately as follows:

| Tray | Amount | To Spray | To Stripper | Prouct |
|---|---|---|---|---|
| 14 | 6,010 | 4,910 | 1,100 | 870, 255° API Hvy dist. |
| Not shown. | 17,710 | 9,180 | 2,530 | 1990, 27° API 250 dist. |
| 24 | 23,480 | 6,700 upper<br>14,510 lower | 2,770 | 1570, 29.5° API 100 dist. |
| 35 | 33,840 | 14,690 upper<br>13,880 lower | | 5270, 36° API Gas Oil. |

I claim as my invention:

In a lubricating oil stock distillation process wherein the distillation zone is divided into several rectification sections superimposed one upon another with a distillate being removed from each rectification section and wherein lubricating oil vapors are passed upwardly through the distillation zone and are separated into distillate fractions, an improvement permitting sharper fractionation with less overlap between neighboring fractions, said improvement comprising (1) passing the vapors upwardly through a first rectification section and into contact with a downwardly directed first liquid spray, said spray serving to knock back the higher boiling components of the vapor that would otherwise tend to pass into the overlying rectification section of the next lower boiling fraction; (2) continuing the flow of the vapors upwardly beyond the spray through a foraminous mist coalescer and a chimney tray condensate collecting means into a second rectification section, said coalescer forestalling the passage of the liquid spray droplet into the overlying second rectification section which has as its lower boundary the condensate collecting means; (3) collecting a first condensate on said chimney tray collecting means, withdrawing the condensate from the collecting means and dividing the withdrawn condensate into one portion that is employed without cooling as the first spray in the underlying first rectification section, and into another portion that is withdrawn to a side stripping zone; (4) steam stripping the withdrawn portion within the side stripping zone to separate an overhead stream of light components from a first lubricating oil distillate product, and returning said stripped light component to the space of the distillation zone between the foraminous coalescer and the condensate collecting means; (5) continuing the passage of the partly fractionated vapors upwardly through the second rectification zone and into successive contact with a second knock-back spray and a second foraminous mat into a third rectification zone which has as its lower boundary a second chimney tray collector means; (6) collecting a second condensate on said second collecting means withdrawing the second condensate from the collecting means and dividing that condensate into at least three parts, returning one part without cooling to the distillation zone as the second knock-back spray; (7) withdrawing a second portion of the second condensate to a second steam stripping zone and there separating overhead a light component fraction that is returned to the distillation zone between the second coalescer and the second condensate collection means, and removing a second lubricating oil distillate as the bottom product from the second stripping zone; (8) cooling the third part of the second condensate to obtain an intermediate spray and spraying said intermediate spray counter-currently to the rising vapors from a position immediately above the second chimney tray collecting means with the third rectification section and preceding the rectifying trays of that section; (9) passing the vapors upwardly through the third rectification section and into successive contacts with a downwardly directed third knock-back spray and a third foraminous coalescer and through a third chimney tray collecting means; (10) collecting a third condensate on the third collecting means withdrawing the third condensate from the collecting means and dividing it into at least three parts, one of which is employed without cooling as the third knock-back spray, and a second part which is cooled and sprayed countercurrently to the rising vapors from a position immediately above the third chimney tray collecting means, and withdrawing the third part from the process as a third distillate.

References Cited in the file of this patent

UNITED STATES PATENTS

| | | |
|---|---|---|
| 1,744,261 | Cooke | Jan. 21, 1930 |
| 1,947,817 | Wallis | Feb. 20, 1934 |
| 2,032,666 | Roberts | Mar. 3, 1936 |
| 2,085,422 | Fast | June 29, 1937 |
| 2,095,418 | McConnell | Oct. 12, 1937 |
| 2,125,325 | Youker | Aug. 2, 1938 |
| 2,805,981 | Cavin et al. | Sept. 10, 1957 |
| 2,809,923 | Hausch | Oct. 15, 1957 |